United States Patent
Wnuk et al.

(10) Patent No.: US 7,131,540 B2
(45) Date of Patent: Nov. 7, 2006

(54) SEPARATING DEVICE, PARTICULARLY FOR SEPARATING SOLIDS FROM LIQUIDS

(75) Inventors: Ralf Wnuk, Bexbach (DE); Markus Maretyak, Clausen (DE)

(73) Assignee: Hydac Process Technology GmbH, Neunkirchen (DE)

( * ) Notice: Subject to any disclaimer, the term of this patent is extended or adjusted under 35 U.S.C. 154(b) by 71 days.

(21) Appl. No.: 10/530,726

(22) PCT Filed: Oct. 7, 2003

(86) PCT No.: PCT/EP03/11041

§ 371 (c)(1),
(2), (4) Date: Apr. 8, 2005

(87) PCT Pub. No.: WO2004/037381

PCT Pub. Date: May 6, 2004

(65) Prior Publication Data
US 2006/0163144 A1  Jul. 27, 2006

(30) Foreign Application Priority Data
Oct. 18, 2002  (DE)  ............... 102 48 638

(51) Int. Cl.
*B01D 29/35*  (2006.01)
(52) U.S. Cl. .................. 210/413; 210/512.1
(58) Field of Classification Search ........... 210/787, 210/788, 407, 413, 512.1
See application file for complete search history.

(56) References Cited

U.S. PATENT DOCUMENTS

| 4,055,500 A | 10/1977 | Parker |
| 4,551,247 A | 11/1985 | Borchert et al. |
| 2004/0055470 A1* | 3/2004 | Strauser et al. ............... 96/417 |

FOREIGN PATENT DOCUMENTS

| EP | 03 387 828 A2 | 9/1990 |
| EP | 0 827 768 A1 | 3/1998 |
| FR | 1 206 619 A | 2/1960 |

* cited by examiner

*Primary Examiner*—Fred G. Prince
(74) *Attorney, Agent, or Firm*—Roylance, Abrams, Berdo & Goodman, L.L.P.

(57) ABSTRACT

The invention relates to a separating device, particularly for separating solids from liquids, preferably from the quantity of reverse flow of a reverse flow filter system. The separating device comprises: a spinning screen provided in the form of a drum screen (17) having an annular screen wall (21); a spray tube (15), which supplies the liquid to the drum screen (17) and which, with regard to its opening (26) to the inside of the screen wall (21) of the drum screen (17), extends in an at least approximately tangential manner thereto in order to produce a spinning flow of the liquid on the screen wall (21); a housing (19) that surrounds the drum screen (17) while serving to hold the liquid passing through said screen wall (21), and; an exit (29) located at the bottom (27) of the drum screen (17) while serving to discharge the separated substances.

8 Claims, 5 Drawing Sheets

SEPARATING DEVICE, PARTICULARLY FOR SEPARATING SOLIDS FROM LIQUIDS

Figure 1:
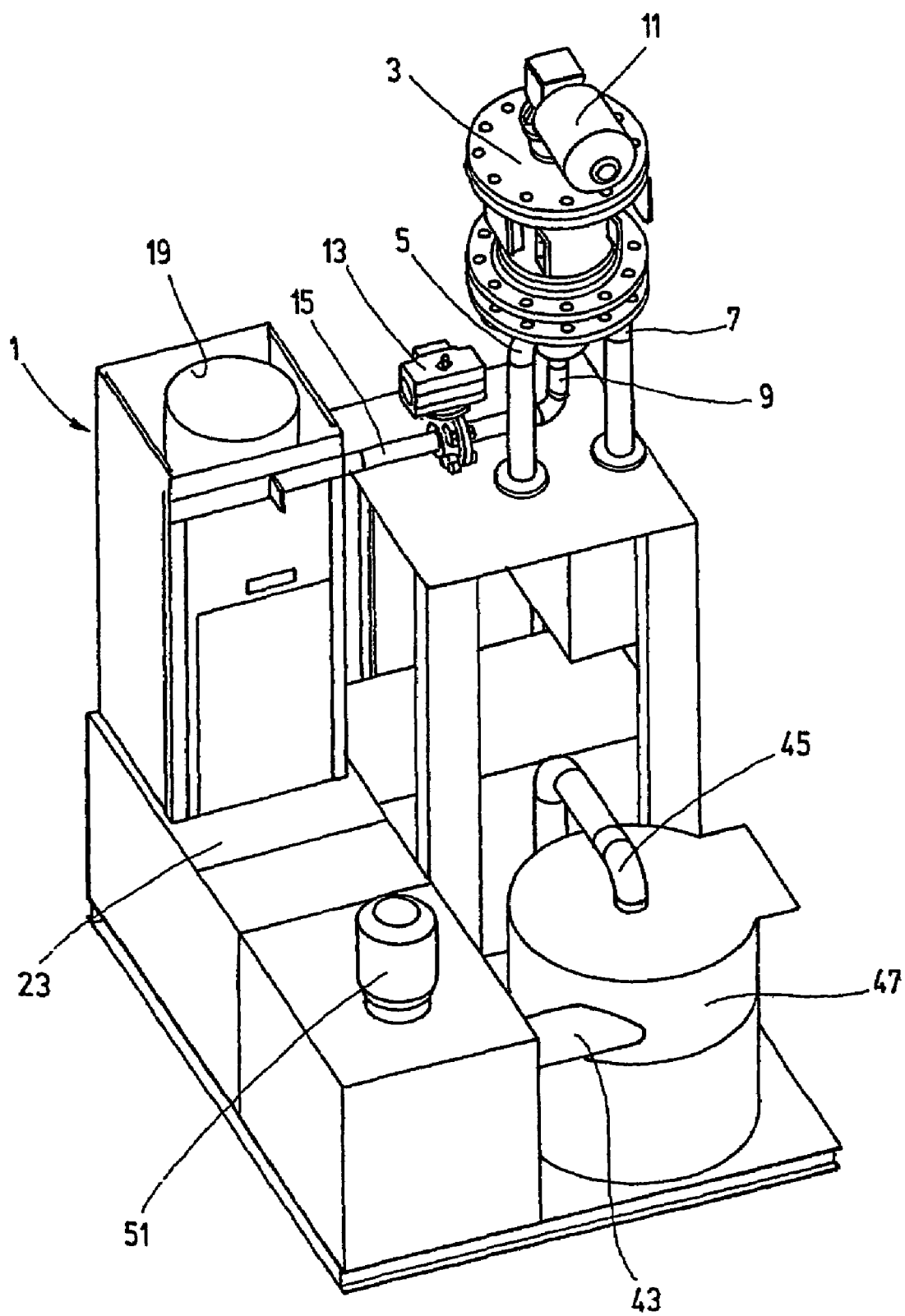

The invention relates to a reverse flow filter system having the characteristics specified in the preamble of claim 1.

Reverse flow filter systems are employed, for example, for preparation of service water for a wide variety of purposes, such as at power plants, for long-distance supply of thermal energy, at sewage treatment plants, in mining, in the paper industry, or the like in order to prepare the process liquids employed so that nozzles, pumps, heat exchangers, and the like are secured from obstruction or wear.

The reverse flow volumes produced in reverse flow filter systems such as the system disclosed in DE 199 56 859, for example, contain solid particles which are removed from the filter elements in the respective reverse flow processes and are washed away together with the reverse flow volume effecting the reverse flow process. Depending on the filter fineness of the filter elements of the reverse flow filter system, which may range from 50 to 3000 microns as a function of the type of fouling and the specific application of the process liquid, the reverse flow volume contains a collection of correspondingly smaller fouling particles which are to be separated in the separating device so that the residual liquid remaining after the separation process may be returned to the respective liquid system.

A generic reverse flow filter system has been disclosed in EP-A-0 387 828. In the disclosed solution a bag filter is mounted downstream from the reverse flow filter of the disclosed reverse flow filter system as filter mechanism in order to separate the fouling substances from the flow of liquid by means of the bag filter during the reverse flow. Depending on the reverse flow volumes accumulated, in the disclosed solution the dimensions of the bag filter must be correspondingly large and with correspondingly large reverse flow volumes the efficiency with respect to the rate of separation is subject to improvement.

In addition, FR-A-1 206 619 discloses a separating device with a housing, a drum screen, and a spray tube which extends tangentially with respect to its opening on the inside of the screen wall of the drum screen, an outlet being provided on the bottom of the drum screen having a mechanism for carrying away the sunken mud-like mass. Separating devices such as this (also see U.S. Pat. No. 4,551,247) are used in particular when liquids are to be prepared which are charged with fouling solids. The disclosed solutions make it possible to conduct an amount of liquid by means of the spray tube into the interior of the drum so that a helical flow is formed on the screen wall, a pressure gradient for the resulting flow of liquid through the screen wall in the radial direction occurring on the entire screen wall surface surrounding the helical flow because of the centrifugal flow component of the adjoining helical flow, while the particles contained on the screen wall are separated and, because of the agitation caused by the helical flow and preventing continuing deposit of the particles on the screen wall, sink to the bottom of the drum.

On the basis of the state of the art indicated in the foregoing the object of the invention is further development of a reverse flow filter system of the type indicated so that this system is especially simple in structure and cost-effective in operation, and in addition so that it is possible to concentrate the fouling substances of the reverse flow more rapidly in order to improve the potential degree of separation as a whole. The object as thus formulated is attained by means of a reverse flow filter system having the characteristics specified in claim 1 in its entirety.

In that, as specified in the characterizing part of patent claim 1 for the reverse flow filter system, a separating device is present for separating solids from the reverse flow volume, having
- a spinning screen in the form of a drum screen with annular screen wall,
- a spray tube conducting the liquid to the drum screen, which spray tube, with respect to its opening, extends at least in approximation tangentially on the inside of the screen wall of the drum screen in order to generate a spin flow on the screen wall and is connected by way of a line to the outlet for the reverse flow volume,
- a housing enclosing the drum screen to receive liquid penetrating the screen wall, and
- an outlet positioned on the bottom of the drum screen for discharge of the substances separated, the separating device being mounted upstream from the filter device it is possible to concentrate the fouling substances of the reverse flow more rapidly in order for it to be possible to process greater amounts of reverse flow. The possibility also exists of reducing the amount of residual liquid in the mud-like mass, and this in turn creates the possibility of reducing the size of the filter device, in particular one in the form of a bag filter.

On the whole the positioning of the separating device in the direction of the liquid upstream from the filter mechanism (bag filter) significantly improves the potential degree of separation of solid fouling substances from liquids.

Because of the pressure gradients generated on the screen wall during the separation process as a result of the centrifugal force component, a high rate of flow through the wall of the drum screen is ensured, even with very great high filter fineness values, down to 2 microns, so that separation of the smallest particles is achieved and thus the liquid flowing through the wall of the drum screen may be returned to the respective system as prepared liquid.

A length of pipe leading downward in which the sunken mud-like mass is moved by the force of gravity may be provided on an opening in the bottom of the drum screen as a mechanism for discharge of the mud-like mass containing the separated substances. As an alternative, the lower end of the length of pipe may be provided with a motor-driven conveying device for discharge of the mud-like mass. In both instances a filter mechanism may be provided which receives the mud-like mass in order to separate the residual liquid present in the mud-like mass from the separated solids, so that these solids may be discharged in partly dewatered condition.

If, by preference, the outlet of the reverse flow filter system may be opened and closed by means of a rapidly opening closing valve, the possibility is provided of initiating a respective reverse flow process intermittently through rapid opening of the closing valve so that removal of fouling substances from the filter element of the reverse flow filter system participating in the reverse flow process is supported by impulse and, as a consequence, even persistent fouling substances may be removed by reverse flows. At the same time, especially good separation performance is achieved in the separating device in that the flow in the drum screen is intermittent, so that the separation process is impulse-assisted as well.

Figure 2:
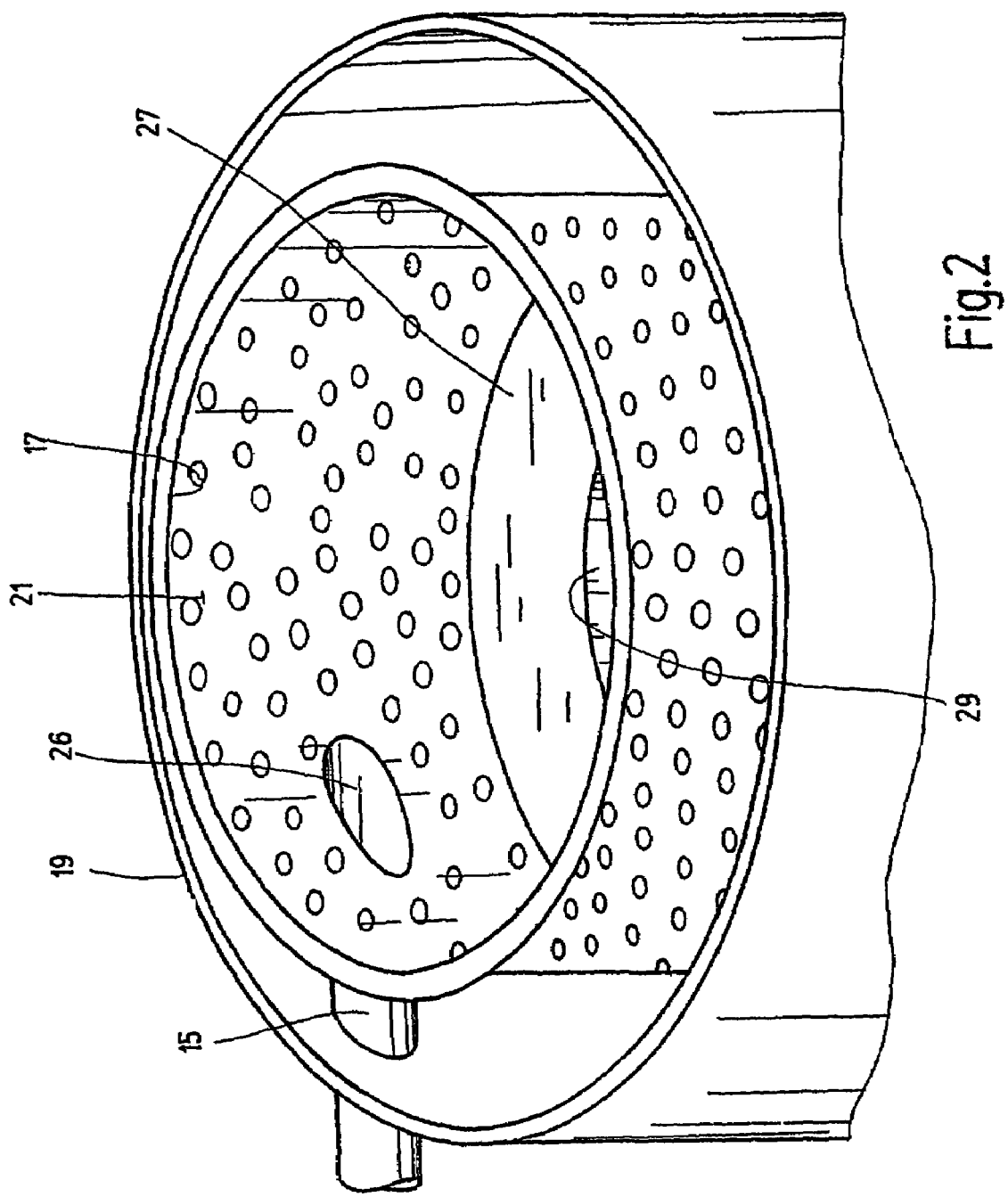
Figure 3:
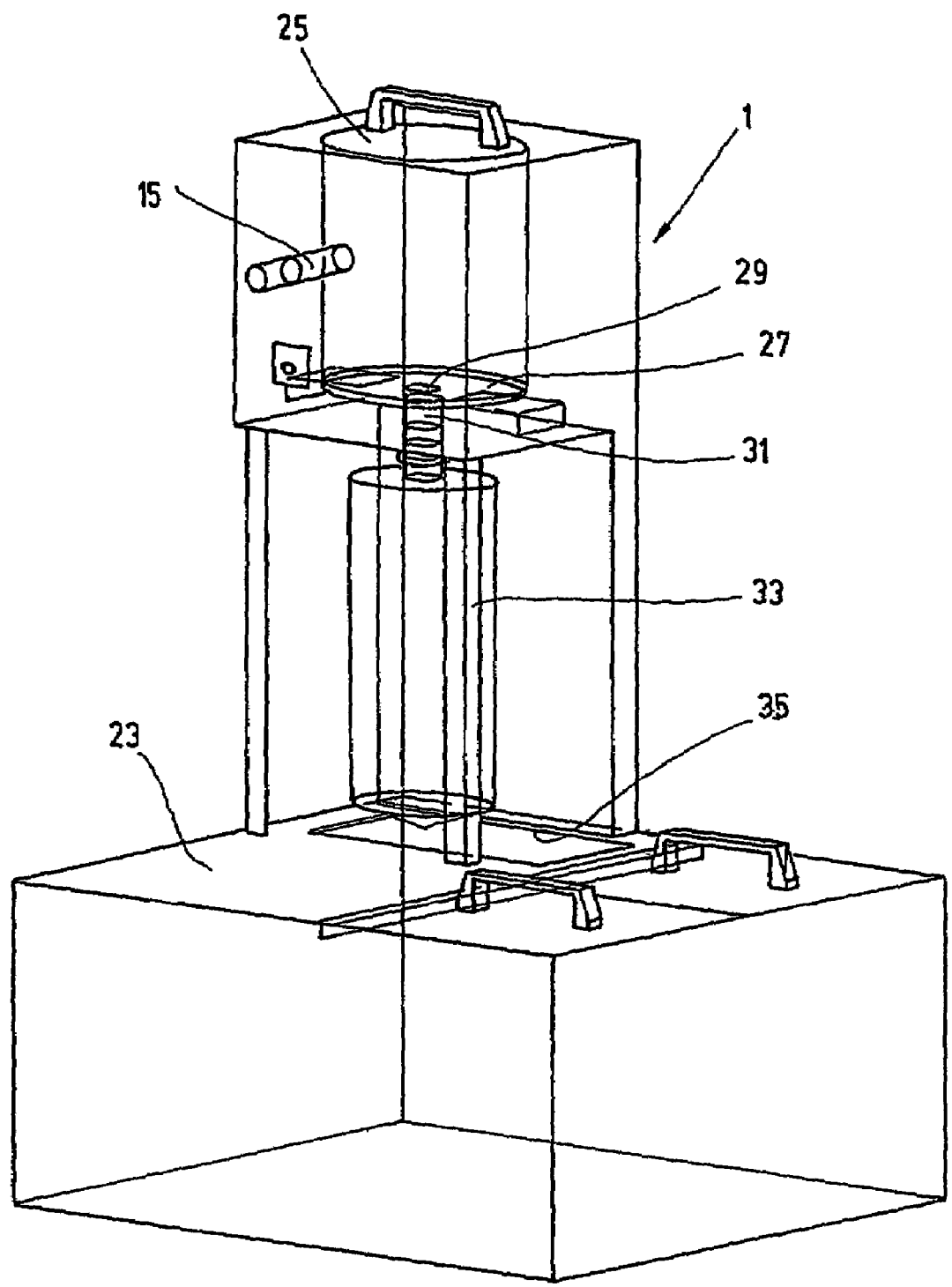
Figure 4:
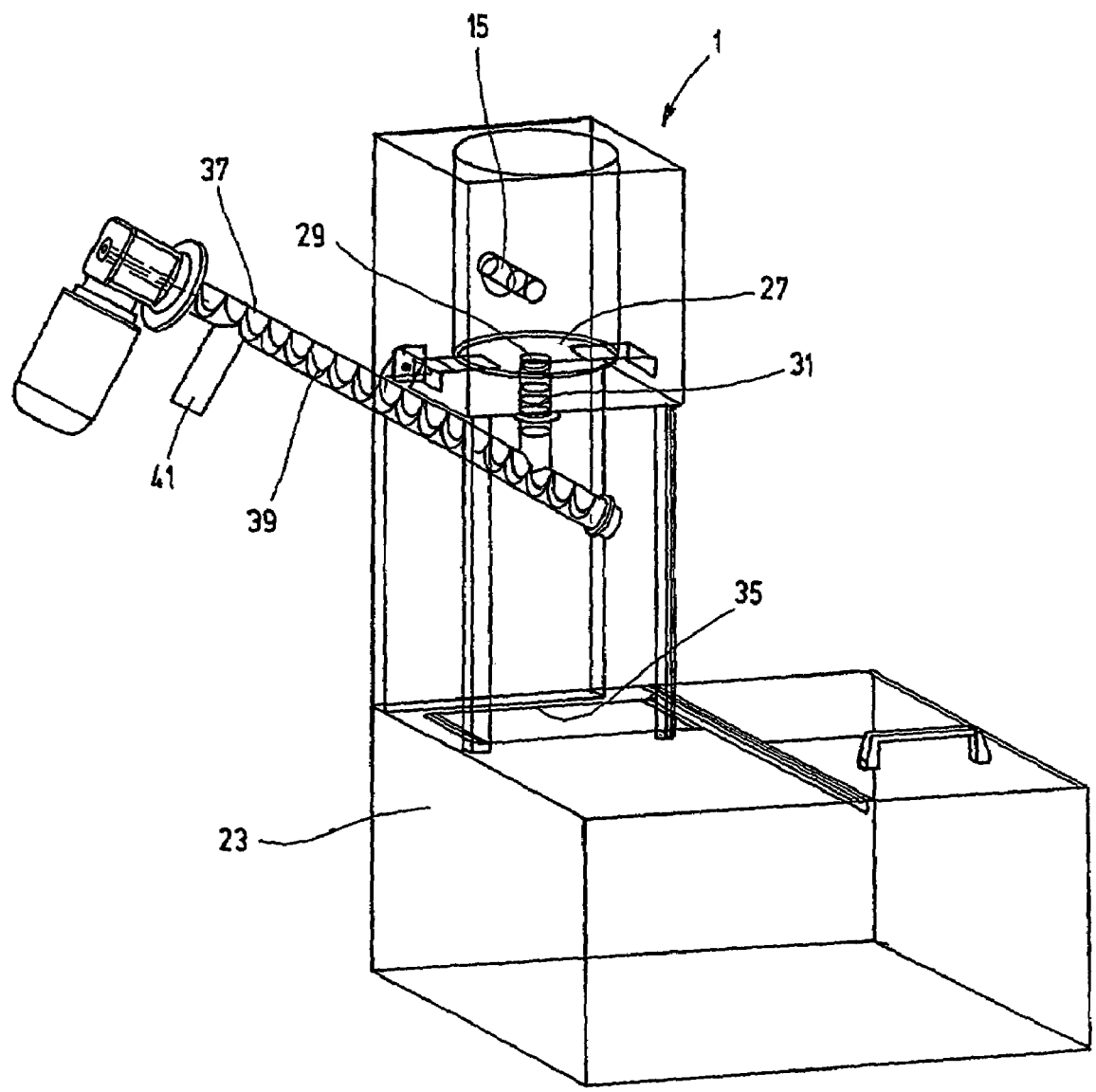
Figure 5:
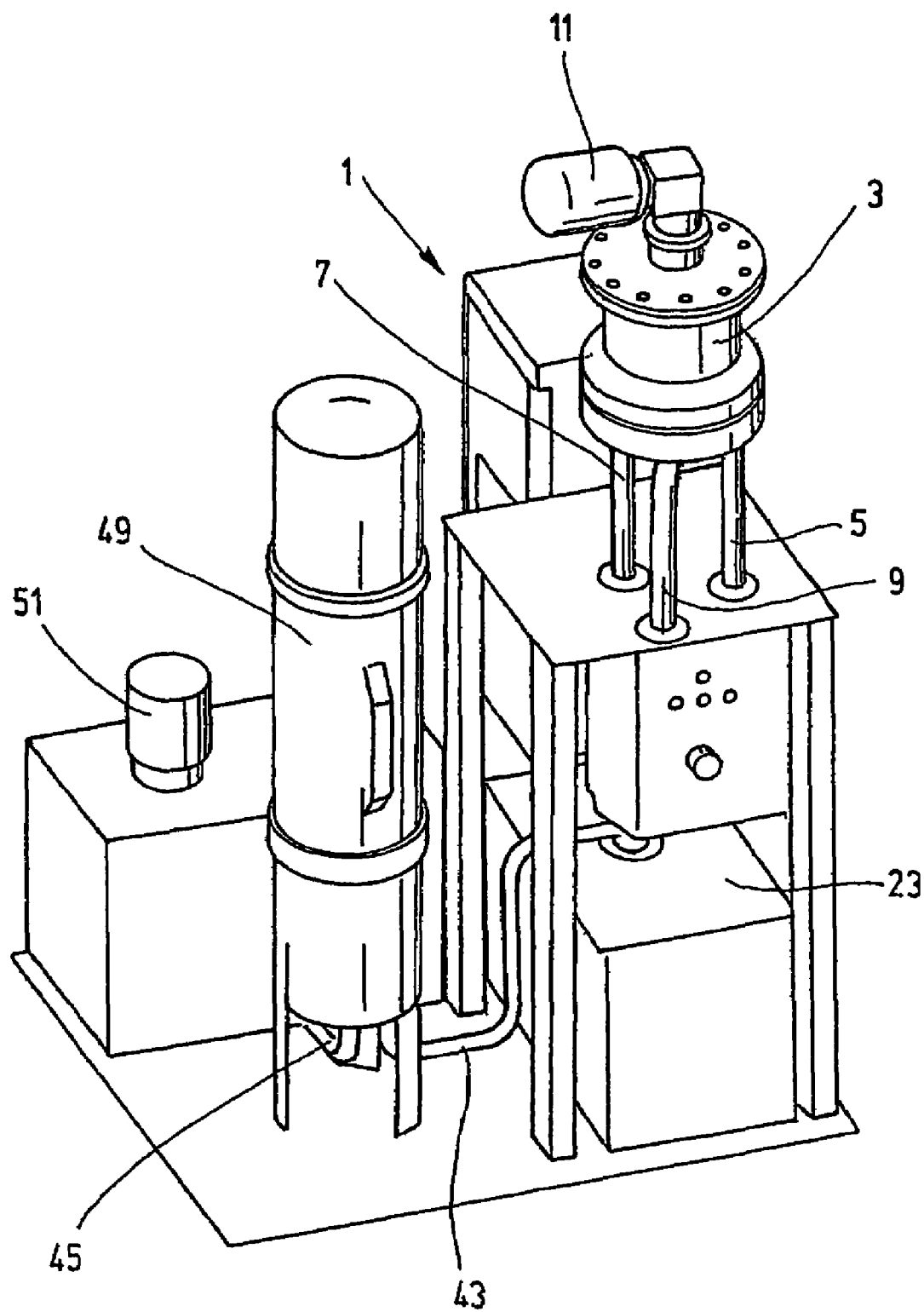

The invention will be described in greater detail below with reference to exemplary embodiments illustrated in the drawing, in which FIG. 1 presents a perspective overall representation in the form of a simplified diagram of the reverse flow filter system with an exemplary embodiment of the separating device mounted upstream from the filter device in the direction of flow;

FIG. 2 a partial perspective view, enlarged in comparison to FIG. 1 and detached, of only the main part of an exemplary embodiment of the separating device containing a drum screen;

FIG. 3 a perspective view on a smaller scale than that of FIG. 2 and greatly simplified of an exemplary embodiment of the separating device connected to the tank of a liquid system;

FIG. 4 a view similar to that of FIG. 3 of a modified example of the separating device; and FIG. 5 an overview similar to that of FIG. 1 of a modified liquid system.

The invention will be described in greater detail below with reference to an exemplary application in which the separating device designated as a whole as 1 in the figures is mounted downstream from a reverse flow filter system 3 (FIGS. 1 and 3) in order to separate the fouling solids from reverse flow volumes discharged from the reverse flow filter system. The reverse flow filter system 3 illustrated here as an example is a system of a known type (see DE 199 56 859 A1), one in which liquid to be prepared is delivered by way of an inlet 5, the filtrate as prepared liquid is discharged by way of an outlet 7, and reverse flow volumes which are produced in the reverse flow processes are discharged by way of an outlet 9. In the reverse flow filter system 3 the liquid to be prepared is caused to flow from the interior outward by conventional means through slotted-tube filter elements. A reverse flow arm rotatable by means of a geared motor 11 and having fluid connection to the outlet 9 is rotated for a reverse flow process beneath the filter element to be cleaned by the motor 11. While filtration operation of the remaining filter elements may proceed without interruption, the filtrate, that is, the liquid surrounding the filter element to be cleaned, flows through the filter element the interior of which is connected to the outlet 9 by way of the reverse flow arm, now from the exterior inward, so that fouling particles are rinsed from the interior of the respective filter element by way of the outlet 9.

The outlet 9 may be opened and closed by means of a rapidly opening closing valve 13 (shown in FIG. 1 only). The reverse flow volumes discharged from the outlet 9 move by way of the closing valve 13 to reach the separating device 1 by way of a spray tube 15. The configuration of the separating device 1 is illustrated in FIGS. 2 and 4, the essential details being shown in FIG. 2 in particular. As is to be seen, a circular drum screen 17 is concentrically mounted so as to be stationary in a cylindrical housing 19. The housing 19 enclosing the screen wall 21 of the drum screen 17 receives liquid which moves from the interior of the drum screen 17 through the screen wall 21 and conducts this liquid as prepared liquid through the drum screen 17 by way a liquid connection (not shown) of a tank system 23 of an associated liquid system. In the exemplary embodiments illustrated in the figures the separating device 1 is in each instance mounted on the upper side of the respective tank system 23.

FIG. 2, in which the housing 19 is shown with the cover removed, this cover being shown only in FIG. 3 and designated as 25, shows that the spray tube 15, which extends through the wall of the housing 19 and the screen wall 21 of the drum screen 17 into the interior space of the latter in a direction which is oriented at least in approximation tangentially to the opening of the spray tube 15, so that there is generated by the reverse flow volume flowing into the drum screen 17 a spin flow which sweeps over the inside of the screen wall 21. The gyroscopic effect of this spin flow, that is, the centrifugal force components generated as a result in the reverse flow volume, makes it possible for a high volume of flow to pass through the screen wall 21, even if the screen wall 21 is in the form of a filter element of very great fineness. This makes it possible to separate impurities made up even of very small particles with sufficiently great throughput of incident reverse flow volumes.

As is to be seen in FIGS. 2 to 4, there is on the bottom 27 of the drum screen 17 an outlet 29 adjacent to which is a length of pipe 31 (see FIGS. 3 and 4) by way of which the mud-like mass which has been built up in the separation process in the drum screen 17 and has sunk to the bottom 27 of the drum screen is carried off. This mud-like mass containing the separated solids is in the embodiment shown in FIG. 3 is introduced by the force of gravity into a filter mechanism, which is a bag filter assembly 33 in the example shown in FIG. 3. A bag filter of paper, a special steel fabric, a plastic fabric, or the like may be provided, the filter fineness corresponding to the type and size of the separated particles contained in the mud-like mass. Filter finenesses of 2 microns to 2000 microns, in particular 15 to 35 microns and by preference 20 to 25 microns, are considered for the filter fineness of the screen wall 21 of the drum screen 17, depending on the type of fouling and the specific application of the liquid to be prepared. Corresponding filter finenesses are suitable for the afterfilter mechanism, that is, the bag filter assembly 33, for the purpose of returning the residual liquid separated from the mud-like mass to the liquid system as prepared liquid. As FIG. 3 shows, the bag filter assembly 33 is positioned above the opening 35 in the tank system 23, so that the filtrate of the bag filter assembly 33 is forced by gravity into the tank system 23.

In the modified example shown in FIG. 4, the lower end of the length of pipe 31 is connected to the conveyance housing 37 of a motor-driven spiral conveyor 39. This conveying device conveys the mud-like mass obliquely upward to an outlet nozzle 49 from which the mud-like mass falls into a disposal mechanism not shown. The lower end of the conveyance housing 37 and/or housing wall is also (something not shown) provided with an afterfilter mechanism which separates the residual liquid from the mud-like mass delivered by way of the length of pipe 31, this residual liquid reaching the tank system 23 through the opening 35 positioned underneath as prepared liquid.

As is to be seen in FIGS. 1 and 5, a secondary flow fine filter mechanism is connected to the tank system 23 by way of secondary flow lines 43 and 45. In the example shown in FIG. 1 the fine filter mechanism is represented by a filter centrifuge 47. In the example shown in FIG. 5 it is represented by a fine filter 49 available commercially under the designation Offline Filter OLF. In the instance of reverse flow filter systems 3 equipped with the separating device, which have a secondary flow fine filter mechanism 47 or 49 connected to the associated tank system 23, the quality may be maintained at the level required for trouble-free operation over very long periods of operation, for example, the quality of an operating liquid fed into an associated hydraulic system by means of a hydraulic pump 51.

The invention claimed is:

1. A reverse flow filter system (3) having
   a reverse flow filter with an inlet (5) for a liquid to be prepared containing the substances to be separated, with an outlet (7) conducting the filtrate as prepared liquid to an associated liquid system (23), and with an outlet (9) for reverse flow volumes charged with separated substances, a closing valve (13) for closing and opening the outlet (9) for the reverse flow volumes, a filter mechanism (33) for separation of residual liquid from a mud-like mass which contains substances separated in the separating device (1), and an assembly (35) for return of the residual liquid to the liquid system (23) as prepared liquid, characterized in that a separating device is present for separating solids from the reverse flow volume, having a spinning screen in the form of a drum screen (17) with annular screen wall (21), a spray tube (15) conducting the liquid to the drum screen (17), which spray tube (15), with respect to its opening (26), extends at least in approximation tangentially on the inside of the screen wall (21) of the drum screen (17) in order to generate a spin flow of the liquid on the screen wall (21) and is connected by way of a line to the outlet (9) for the reverse flow volume, a housing (19) enclosing the drum screen (17) to receive liquid penetrating the screen wall (21), and an outlet (29) positioned on the bottom (27) of the drum screen (17) for discharge of the substances separated, and in that the separating device is mounted upstream from the filter mechanism.

2. The reverse flow filter system as claimed in claim 1, wherein the outlet (29) on the bottom (27) of the drum screen (17) has a mechanism (31) for conducting away the mud-like mass which has sunken to the bottom (27) of the drum screen (17) and contains the substances separated.

3. The reverse flow filter system as claimed in claim 2, wherein the mechanism for conducting away the mud-like mass has, positioned on an opening (29) in the bottom (27), a length of pipe (31) inclining downward, preferably a vertical length of pipe (31), for conducting away the mud-like mass under the force of gravity.

4. The reverse flow filter system as claimed in claim 3, wherein there is provided on the lower end of the length of pipe (31) the filter mechanism (33) receiving the mud-like mass for separation of the residual liquid present in the mud-like mass from the substances separated.

5. The reverse flow filter system as claimed in claim 3, wherein the lower end of the length of pipe (31) is provided with a motor-driven conveying mechanism (37, 39) for conducting away the mud-like mass.

6. The reverse flow filter system as claimed in claim 5, wherein the conveying mechanism has a rotatable helical conveyor (39) in a conveyance housing (37) and wherein a filter mechanism is associated with the conveyance housing (37) in order to separate residual liquid from the mud-like mass.

7. The reverse flow filter system as claimed in claim 1, wherein the closing valve (13) is configured as a rapidly opening valve.

8. The reverse flow filter system as claimed in claim 1, wherein the liquid system has a tank (23) associated with a hydraulic system to which tank the filtrate may be conducted from the outlet (7) of the reverse flow filter as prepared liquid and which is connected to the filter mechanism (33) of the separating device (1) for conduct of the discharged residual liquid, and wherein a secondary flow fine filter mechanism (47, 49) is connected to the tank (23).

* * * * *